United States Patent
Kalb et al.

(10) Patent No.: US 10,105,855 B2
(45) Date of Patent: *Oct. 23, 2018

(54) QUICK DISCONNECT APPARATUS FOR MODULAR TOOLING

(71) Applicant: Norgren Automation Solutions, LLC, Saline, MI (US)

(72) Inventors: James R. Kalb, Petersburg, MI (US); Michael Thomas Charlton, Clinton, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/044,178

(22) Filed: Feb. 16, 2016

(65) Prior Publication Data

US 2016/0236357 A1     Aug. 18, 2016

Related U.S. Application Data

(60) Provisional application No. 62/116,633, filed on Feb. 16, 2015.

(51) Int. Cl.
  *B25J 17/02*     (2006.01)
  *B25J 15/04*     (2006.01)
  *B23B 31/107*    (2006.01)

(52) U.S. Cl.
  CPC ........... *B25J 17/02* (2013.01); *B23B 31/1071* (2013.01); *B25J 15/0416* (2013.01); *Y10T 279/1041* (2015.01)

(58) Field of Classification Search
  CPC ... B23B 31/22; B23B 31/1071; B23B 31/404; B25J 15/0416; B25J 17/02; Y10T 279/1037; Y10T 279/1041
  See application file for complete search history.

(56) References Cited

U.S. PATENT DOCUMENTS

| 4,135,418 A | 1/1979 | McCray et al. |
| 4,350,463 A | 9/1982 | Friedline |

(Continued)

FOREIGN PATENT DOCUMENTS

| JP | 2012187707 A | * 10/2012 | ........... B23Q 1/0072 |
| WO | 2014045390 A1 | 3/2014 | |

(Continued)

OTHER PUBLICATIONS

Invitation to Pay Additional Fees, and, Where Applicable, Protest Fee dated Jun. 28, 2016, pp. 3-4, International Patent Application No. PCT/US2016/018025.

*Primary Examiner* — Eric A Gates

(74) *Attorney, Agent, or Firm* — Young Basile Hanlon & MacFarlane, P.C.

(57) ABSTRACT

A modular tooling receiver that includes a wall having a port that extends through it, an engaging member that is movably disposed in the port, and a lock actuator that is disposed on a first side of the wall. The lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall. A first biasing element biases the lock actuator toward the first position. A damper controls a rate of motion of the lock actuator from the second position toward the first position.

20 Claims, 10 Drawing Sheets

(56) References Cited

U.S. PATENT DOCUMENTS

| | | | |
|---|---|---|---|
| 4,432,506 A * | 2/1984 | Bingaman | B23B 31/1071 |
| | | | 242/573.9 |
| 4,655,655 A | 4/1987 | Schürfeld | |
| 4,767,246 A | 8/1988 | Camloh et al. | |
| 4,793,053 A | 12/1988 | Zuccaro et al. | |
| 4,824,298 A | 4/1989 | Lippacher et al. | |
| 4,836,068 A | 6/1989 | Erickson | |
| 4,863,323 A | 9/1989 | Glaser | |
| 4,919,023 A | 4/1990 | Bloink | |
| 5,211,501 A | 5/1993 | Nakamura et al. | |
| 5,870,935 A * | 2/1999 | Erickson | B23B 29/046 |
| | | | 279/2.11 |
| 60,003,061 | 12/1999 | Erickson | |
| 6,398,279 B1 | 6/2002 | Kikut | |
| 6,932,358 B1 | 8/2005 | Geisman et al. | |
| 7,252,453 B1 | 8/2007 | Little | |
| 7,621,200 B2 | 11/2009 | Ichikawa | |
| 7,779,716 B2 | 8/2010 | Dellach et al. | |
| 8,005,570 B2 | 8/2011 | Gloden et al. | |
| 8,220,804 B2 * | 7/2012 | Erickson | B23B 31/06 |
| | | | 279/2.11 |
| 8,601,667 B2 * | 12/2013 | Norton | B23B 31/1071 |
| | | | 279/140 |
| 9,669,469 B2 * | 6/2017 | Lin | B23B 31/1071 |
| 2016/0059424 A1 * | 3/2016 | Zachary | B23B 31/30 |
| | | | 483/1 |

FOREIGN PATENT DOCUMENTS

| | | | | |
|---|---|---|---|---|
| WO | WO 2014045390 A1 * | 3/2014 | | B25J 15/0416 |
| WO | 2014156508 A1 | 10/2014 | | |
| WO | WO 2015110170 A1 * | 7/2015 | | B25J 15/0416 |

* cited by examiner

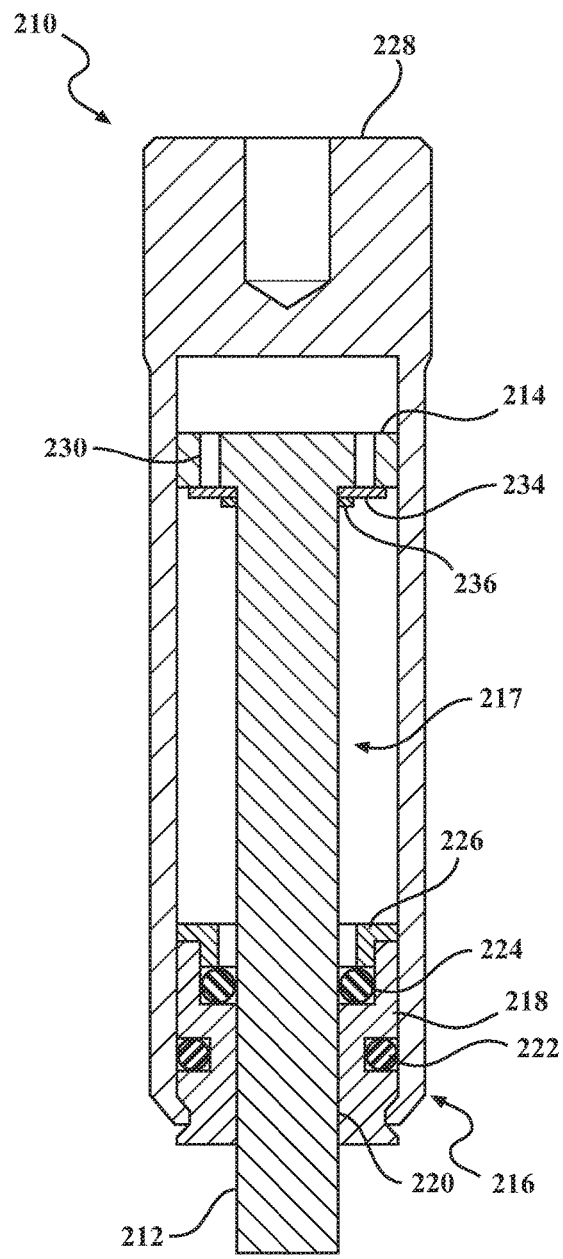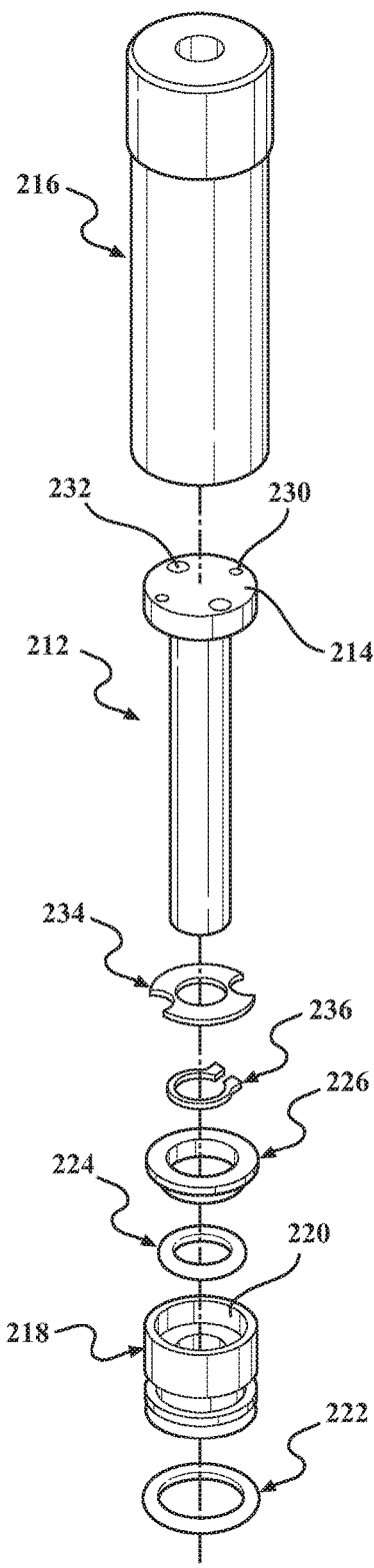
FIG. 13
FIG. 14

QUICK DISCONNECT APPARATUS FOR MODULAR TOOLING

CROSS-REFERENCE TO RELATED APPLICATIONS

This application claims the benefit of U.S. provisional application No. 62/116,633, which was filed on Feb. 16, 2015.

BACKGROUND

Industrial manufacturing operations are often performed using automated manufacturing equipment, such as mechanical manipulators and robotic arms. The manufacturing equipment is often fitted with tooling that is intended to perform a specific function. The tooling may be specifically configured to a particular part, such that certain work holding devices, such as clamps, grippers, vacuum cups, etc. may engage and move the workpiece. The tooling is typically designed based on the geometry of the part with which it is intended to be used, and tooling that is designed for use with a particular part usually cannot be used with a different part.

Removable and replaceable tooling allows manufacturing equipment to be used to manufacture parts with various configurations as opposed to being dedicated to one particular part configuration. However, the time and effort needed to reconfigure manufacturing equipment from one purpose to another must be minimized to the greatest extent possible without comprising the accuracy and precision of the manufacturing equipment. In some designs, tooling is connected to the manufacturing equipment by conventional fasteners. Other designs provide quick disconnect tooling that allows the tooling to be replaced using a two-part coupler that can be quickly connected and disconnected. These two part couplers often include structures that align and lock to the two coupler parts with respect to each other without the need for special tools or alignment procedures. Many quick disconnect coupler designs are, however, costly or difficult to operate. Therefore, need remains for quick disconnect couplers that are inexpensive and simple to operate.

SUMMARY

One aspect of the disclosure is a modular tooling receiver that includes a wall having a port that extends through it, an engaging member that is movably disposed in the port, and a lock actuator that is disposed on a first side of the wall. The lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall. A first biasing element biases the lock actuator toward the first position. A damper controls a rate of motion of the lock actuator from the second position toward the first position.

Another aspect of the disclosure is a modular tooling receiver that includes a housing having an internal cavity, a cylindrical wall that surrounds the internal cavity and extends along a longitudinal axis, and a plurality of ports that extend through the cylindrical wall in a direction that is substantially transverse to the longitudinal axis. A plurality of engaging members are each at least partially seated in a respective port from the plurality of ports and are moveable with respect to the cylindrical wall. A piston is disposed within the internal cavity. The piston has a first engagement surface formed on an outer periphery thereof and a second engagement surface formed on an outer periphery thereof, wherein the piston is movable between a first position and a second position with respect to the housing. The piston is moveable between a first position in which the piston urges the engaging members in an outward direction relative to the cylindrical wall and a second position wherein the piston permits the engaging members to move inward relative to the cylindrical wall. A first biasing element biases the piston toward the first position. A damper controls a rate of motion of the piston from the second position toward the first position.

BRIEF DESCRIPTION OF THE DRAWINGS

The various other uses of the present invention will become more apparent by referring to the following detailed description and drawings in which:

FIG. 13 is a cross-section view of a damper.

FIG. 14 is an exploded view of the damper.

DETAILED DESCRIPTION

Figure 1:
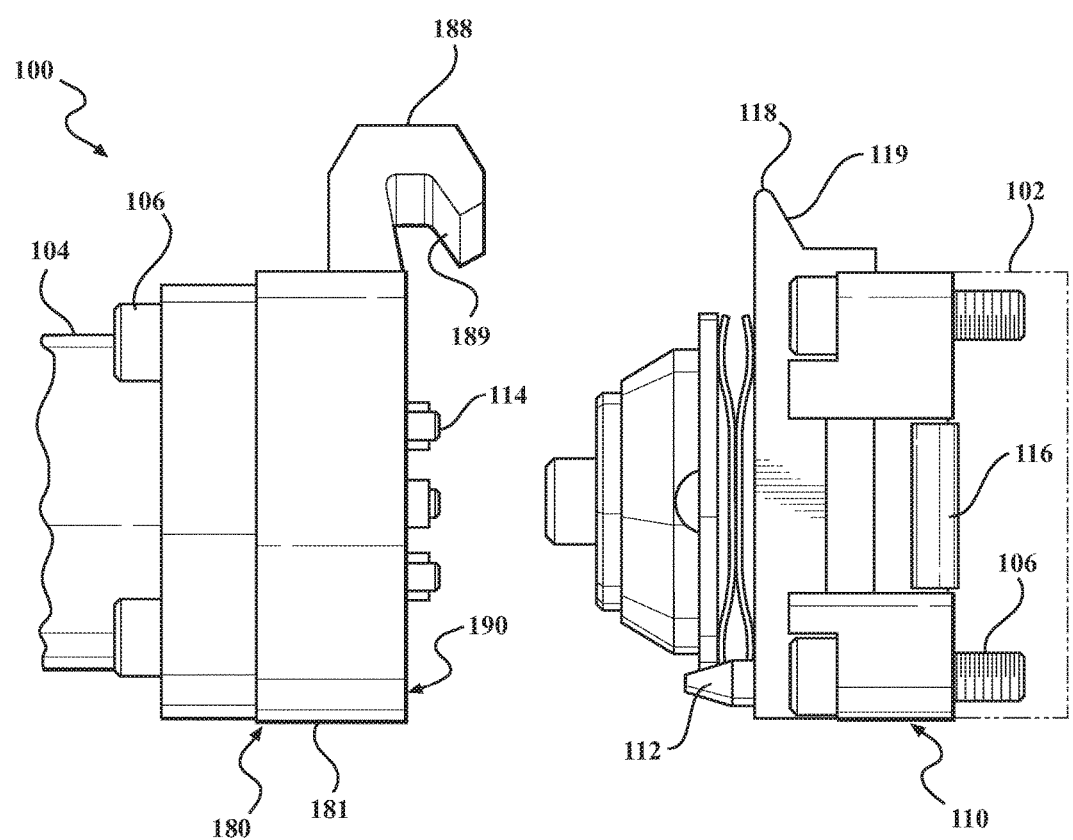
FIG. 1 is a side view showing a quick disconnect apparatus in a disconnected position.
Figure 2:
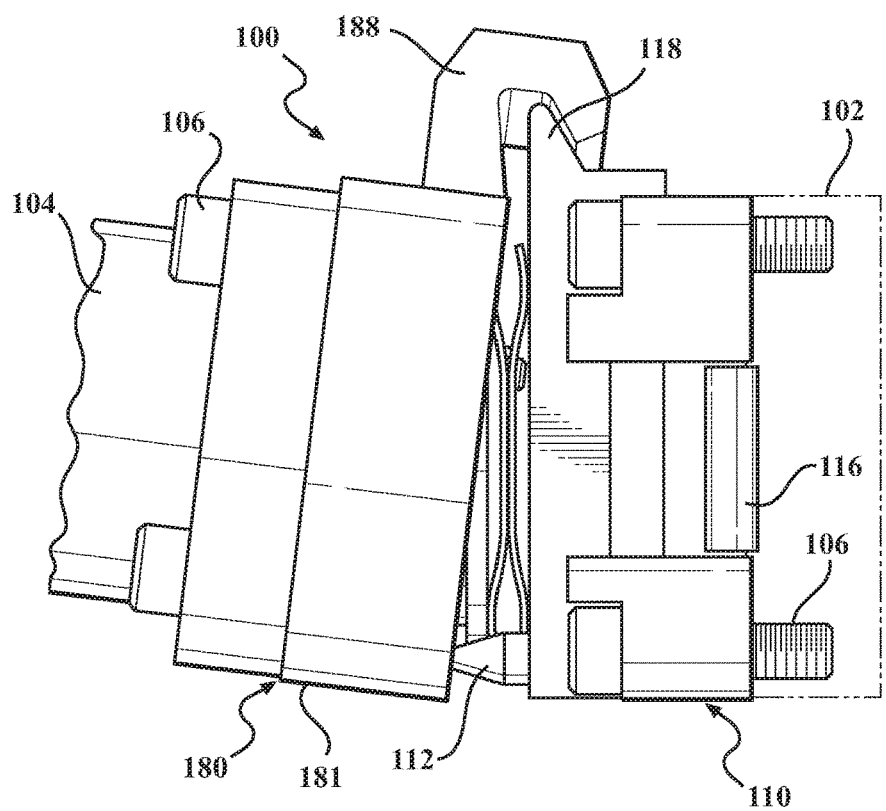
FIG. 2 is a side view showing the quick disconnect apparatus in a partially connected position.
Figure 3:
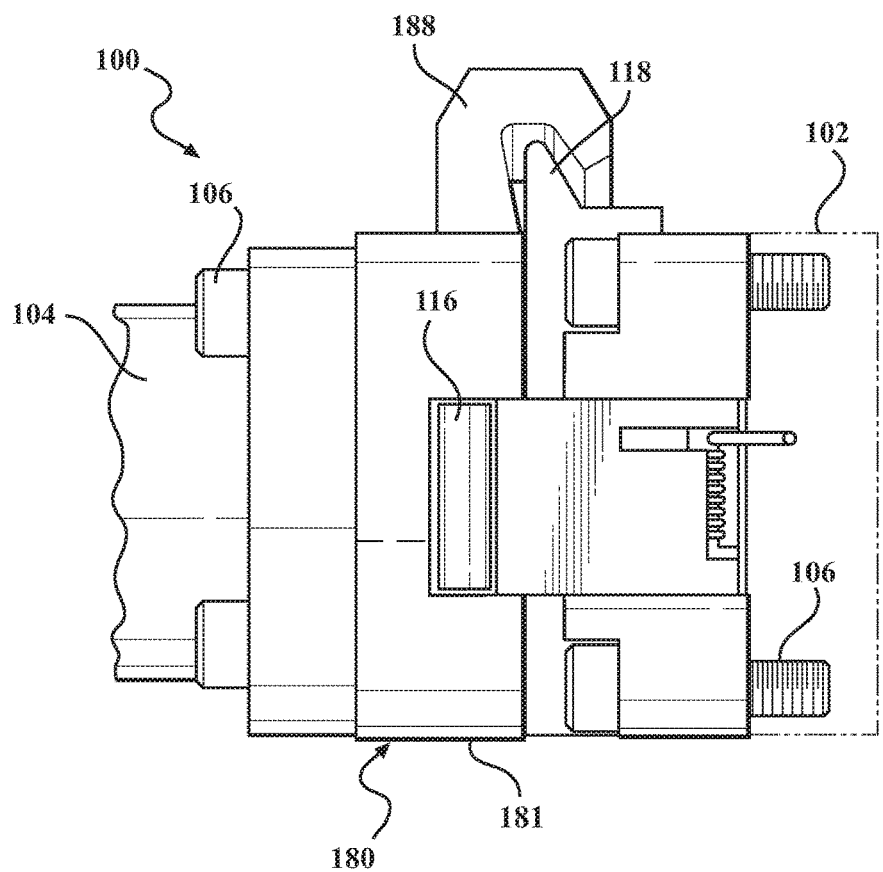
FIG. 3 is a side view showing the quick disconnect apparatus in a connected position.

FIGS. 1-3 show a quick disconnect apparatus 100 that includes a receiver 110 and a coupler 180 that is removably connectable to the receiver 110. In particular, the receiver 110 and the coupler 180 are moveable between a disconnected position (FIG. 1), wherein the receiver 110 and the coupler 180 are not in engagement with one another, a partially connected position (FIG. 2), wherein the receiver 110 is partially engaged with the coupler 180 but not locked to the coupler 180, and a connected position (FIG. 3), wherein the receiver 110 and the coupler 180 are in engagement with one another and are locked in a fixed relationship with respect to one another. The quick disconnect apparatus 100 may be part of a modular tooling assembly. The receiver 110 may also be referred to as a modular tooling receiver. The coupler 180 may also be referred to as a modular tooling adapter.

The quick disconnect apparatus 100 can be used to connect a base structure 102 to a tooling assembly 104. The base structure 102 can be any structure to which an additional structure, such as the tooling assembly 104, is desired to be attached. As one example, the base structure 102 can be automated manufacturing equipment, such as a mechanical manipulator or a robotic arm. The tooling assembly 104 can be any type of tooling as needed to perform a particular function and can include modular tooling, such as rods, joints, connectors, couplers, fingers, and/or shovels. The base structure 102 and the tooling assembly 104 can be connected to the receiver 110 and the coupler 180, respectively, using conventional elements such as fasteners 106.

In order to support the coupler 180 with respect to the receiver 110 while the coupler 180 is being connected to the receiver 110, the coupler 180 includes an elongate hook 188 and the receiver 110 includes an elongate flange 118. In the partially connected position, the coupler 180 is moved into engagement with the receiver 110 by placing the elongate hook 188 over the elongate flange 118 such that a rear facing angled interior surface 189 of the elongate hook 188 is engaged with a rear facing angled surface 119 of the elongate flange 118. When the rear facing angled interior surface 189 is engaged with and angularly aligned with (e.g. substantially coplanar with) the rear facing angled surface 119, the coupler 180 is angled with respect to the receiver 110, but can then be moved to the connected position by rotating the coupler 180 toward alignment with the receiver 110, with this rotation being centered on the point at which the elongate hook 188 contacts the elongate flange 118.

In order to align the connection between the receiver 110 and the coupler 180, one or more guide structures can be provided, such as a tapered guide pin 112. In the illustrated example, the tapered guide pin 112 is located on the receiver 110 and is received in a corresponding aperture in the coupler 180 when the receiver 110 and the coupler 180 are moved to the connected position. Also, to ensure that the appropriate coupler 180 is connected to the receiver 110, mechanical code pins 114 can be provided on each of the receiver 110 and the coupler 180.

Figure 4:
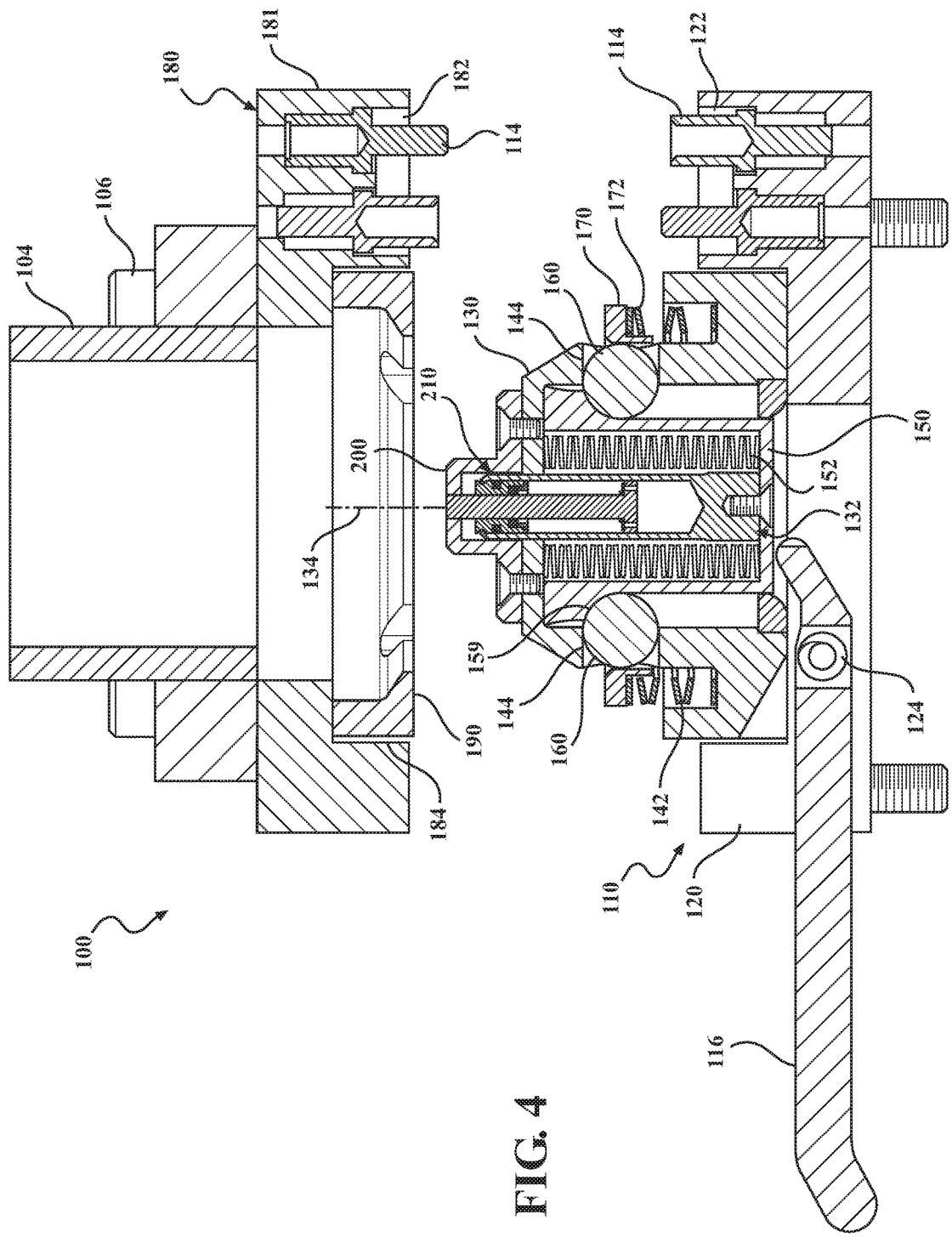
FIG. 4 is a cross-section view showing a quick disconnect apparatus in a disconnected position.

When the receiver 110 and the coupler 180 are in the disconnected position, they can be moved to the connected position by moving the receiver 110 and the coupler 180 toward one another. When the receiver 110 and the coupler 180 are in the connected position, they can be moved to the disconnected position by first operating a release mechanism, such as a lever 116 that can be pivoted from a locked position (FIG. 5) to a release position (FIGS. 4 and 6). When the lever 116 reaches the release position, the lock previously established between the receiver 110 and the coupler 180 ceases, thus allowing the receiver 110 and the coupler 180 to be moved away from one another, as will be explained in detail herein.

Figure 5:
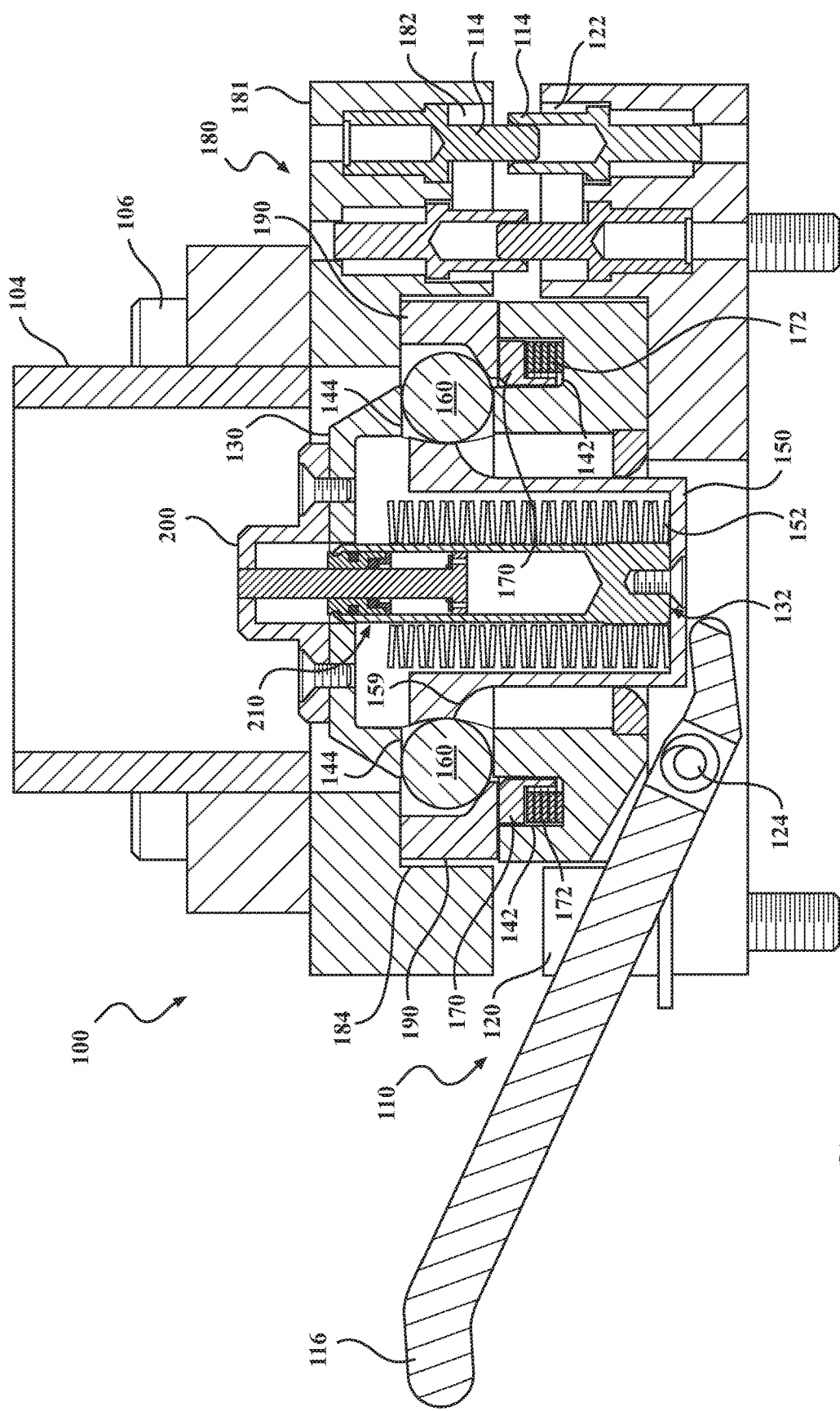
FIG. 5 is a cross-section view showing the quick disconnect apparatus in a connected position with a release mechanism in a locked position.
Figure 6:
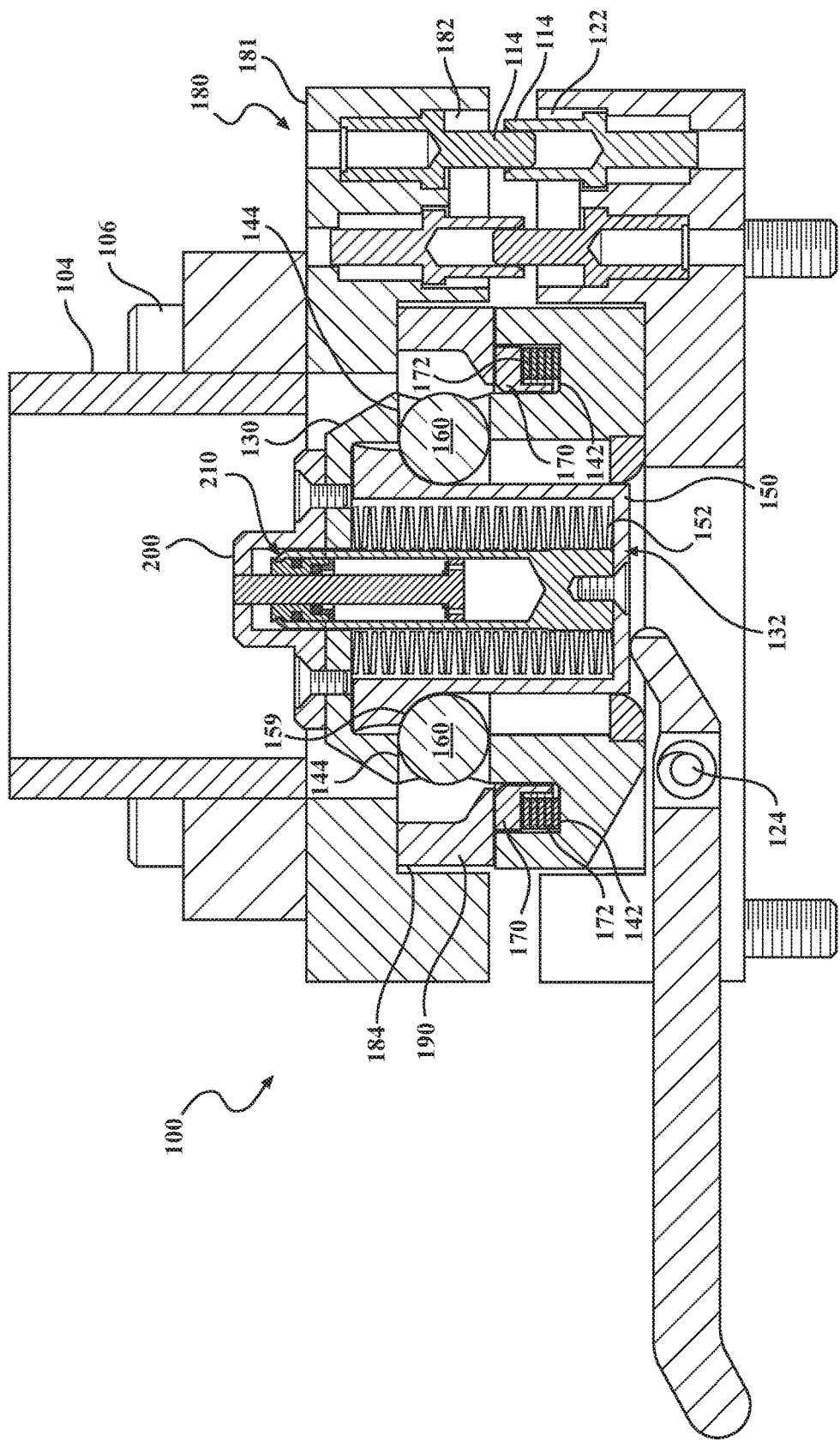
FIG. 6 is a cross-section view showing the quick disconnect apparatus in a connected position with a release mechanism in a release position.

As best shown in FIGS. 4-6, the receiver 110 includes a receiver base portion 120 that is connectable to the base structure 102. The mechanical code pins 114 are disposed in apertures 122 that are formed in the receiver base portion 120. The lever 116 is pivotally connected to the receiver base portion 120 and is biased away from the release position (FIG. 4), in a clockwise direction as shown in FIG. 5, by a biasing element 124, such as a torsion spring.

The receiver 110 includes a receiver housing 130, which defines an internal cavity 132. The receiver housing 130 can extend along an axis 134. The axis 134 can extend through the internal cavity 132. In the illustrated example, the internal cavity 132 is substantially cylindrical, and the axis 134 is a central axis of the internal cavity 132.

Figure 7:
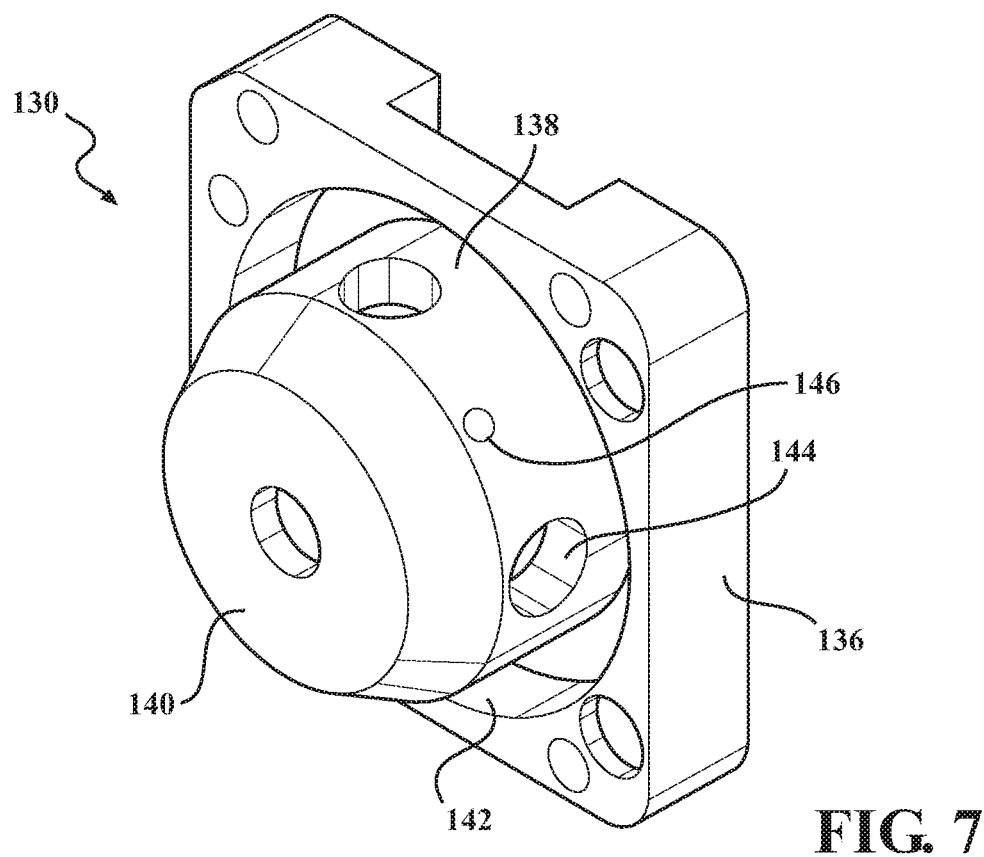
FIG. 7 is a perspective view of a receiver housing.
Figure 8:
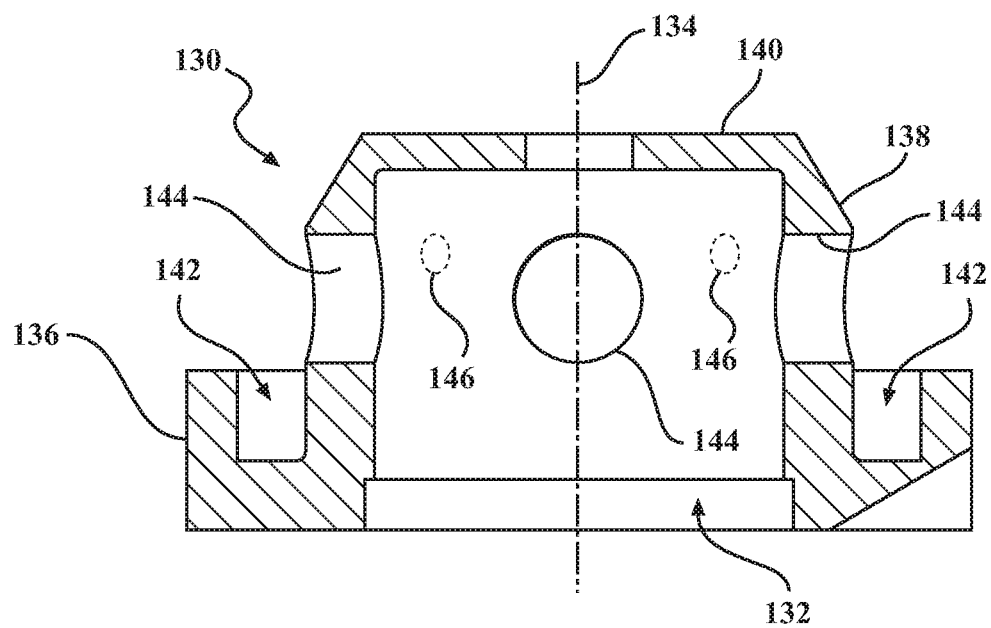
FIG. 8 is a cross-section view of the receiver housing.

As best seen in FIGS. 7-8, the receiver housing 130 includes a base 136 that is connectable to the receiver base portion 120 of the receiver 110. A substantially cylindrical wall 138 extends outward from the base 136 and substantially encircles the internal cavity 132. An end wall 140 extends transverse to the axis 134 and extends inward from the cylindrical wall 138 opposite the base 136.

The receiver 110 includes a piston 150 that is disposed within the internal cavity 132 of the receiver housing 130, and a biasing element such as a compression spring 152 that biases the piston 150 away from the receiver housing 130 along the axis 134. Other suitable biasing elements include a Belleville washer stack or a block of compressible elastic material. The rate of motion of the piston 150 away from the receiver housing 130 is controlled by a damper 210. The damper 210 is fixed to the piston 150 and a piston rod 212 of the damper is connected to the receiver housing 130 either directly or by a retainer 200 that is fixed to the housing by conventional fasteners or methods.

The piston 150 is engageable with a plurality of engaging members 160. In one example, the engaging members 160 are substantially spherical members, such as ball bearings.

The receiver 110 further includes a bearing retainer 170 that controls movement of the engaging member 160 with respect to the receiver housing 130. A biasing element 172 engages the bearing retainer 170 in order to bias the bearing retainer 170 away from the receiver housing 130. As examples, the biasing element 172 can be a compression spring, a Belleville washer stack, or a block of compressible elastic material. The bearing retainer 170 can be in the form of a ring-shaped member that encircles the cylindrical wall 138 of the receiver housing 130 and has an inner diameter that is complementary to the outer diameter of the cylindrical wall 138 of the receiver housing 130. In order to receive the bearing retainer 170 and the biasing element 172, a channel 142 is formed in the base 136 of the receiver housing 130. The channel 142 can be substantially circular and can substantially encircle the cylindrical wall 138.

In order to at least partially receive the engaging members 160, a plurality of ports or apertures 144 extend through the cylindrical wall 138 of the receiver housing 130. In implementations where the engaging members are spherical, the apertures 144 can be substantially circular in cross-section when viewed in a direction that is substantially perpendicular to the surface of the cylindrical wall 138. The apertures may extend through the cylindrical wall in a direction that is substantially transverse to the axis 134, such as in a radial direction relative to the cylindrical wall 138.

In order to retain the bearing retainer 170 and the biasing element 172 on the receiver housing 130 and to define a limit of travel for the bearing retainer 170, a plurality of posts 146 can extend outward from the cylindrical wall 138 of the receiver housing 130. The posts 146 can be any type of projection that extends outward from the nominal periphery of the cylindrical wall 138 of the receiver housing 130, and may be structures such as pins or ridges or bumps. The posts 146 can be formed on the cylindrical wall 138 or can be connected to the cylindrical wall 138 by any suitable means such as by threaded engagement of the posts 146 with threaded apertures (not shown) that are formed through the cylindrical wall 138. Accordingly, the bearing retainer 170 can move between a retracted position, wherein the bearing retainer 170 is disposed in the channel 142 and does not block or obstruct the apertures 144, and an extended position, wherein the bearing retainer is engaged with the posts 146 and blocks or obstructs the apertures 144. The biasing element 172 biases the bearing retainer 170 toward the extended position.

The posts 146 are positioned at radially spaced location arounds the cylindrical wall 138 of the receiver housing 130.

The posts 146 may be equal in number to the apertures 144, with one of the posts 146 positioned between each adjacent pair of the apertures 144.

Figure 9:
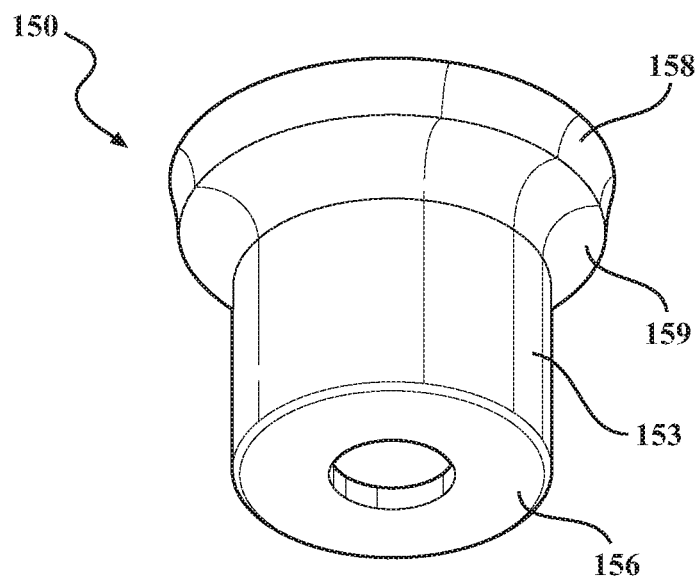
FIG. 9 is a perspective view of a piston.
Figure 10:
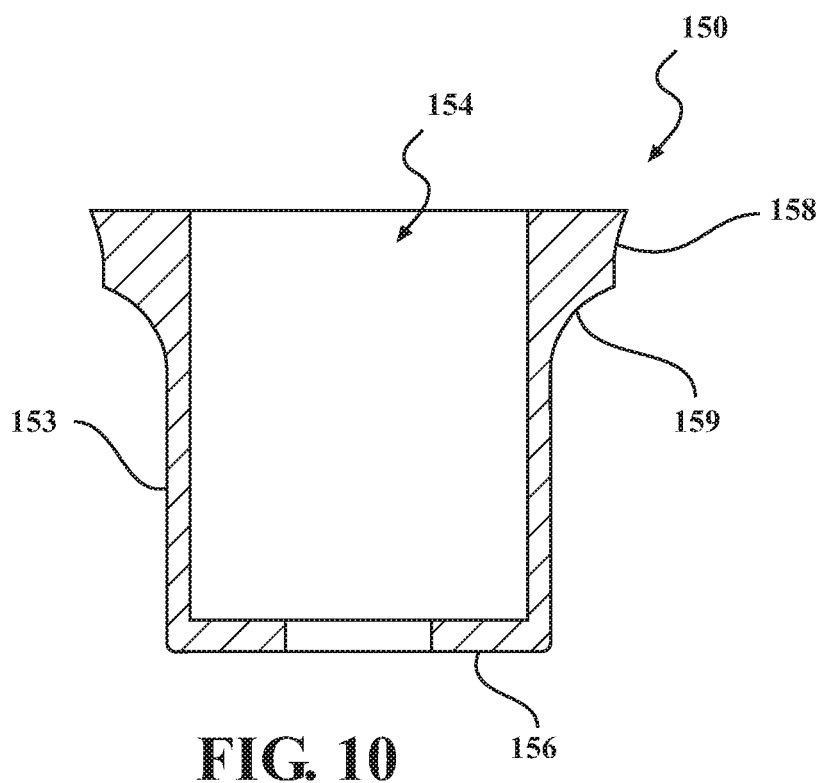
FIG. 10 is a cross-section view of the piston.

The piston 150 is best shown in FIGS. 9-10. The piston 150 can include a cylindrical wall 153 that encircles an internal cavity 154, and an end wall 156 is connected to the cylindrical wall 153 and is disposed opposite an open end of the internal cavity 154. Adjacent to the open end of the internal cavity 154 of the piston 150, a first contoured engagement surface 158 and a second contoured engagement surface 159 can be formed around an outer periphery of the cylindrical wall 153 of the piston 150 for engagement with the engaging members 160, as will be explained in detail herein.

With reference to FIGS. 4-6, the piston 150 is moveable between a disengaged position (FIGS. 4 and 6) and an engaged position (FIG. 5). The piston 150 moves within the internal cavity 132 of the receiver housing 130 along the axis 134 under the influence of the biasing force that is applied to the piston 150 by the compression spring 152, which is disposed within the internal cavity 154 of the piston 150 such that it engages the receiver housing 130 and the piston 150.

The disengaged position of the piston 150 is established when the piston 150 is moved in response to engagement of the lever 116 with the piston 150. In particular, when the lever 116 is moved to the release position, the lever 116 engages the piston 150 such that the compression spring 152 is compressed as the piston 150 moves from the engaged position toward the disengaged position.

In the disengaged position, the second contoured engagement surface 159 of the piston 150 is positioned adjacent to the apertures 144 in the receiver housing 130. Because the second contoured engagement surface 159 has a smaller maximum diameter than the first contoured engagement surface 158 and is contoured such that it is complementary to the engaging members 160, the engaging members 160 are able to move inward with respect to the receiver housing 130 and toward the second contoured engagement surface 159 of the piston 150 when the piston 150 is in the disengaged position. As an example, the size and shape of the second contoured engagement surface can allow the engaging members 160 to retract into the receiver housing 130 by a distance that is sufficient to cause the outermost portions of the engaging members to be positioned even with or inward with respect to the cylindrical wall 138 of the receiver housing 130. Thus, when the piston 150 is in the disengaged position, the biasing force applied to the bearing retainer 170 by the biasing element 172 causes the bearing retainer 170 to extend, such that it is positioned adjacent to the apertures 144 and forces the engaging members 160 to move into the apertures 144 of the receiver housing 130. Once this position is established, the bearing retainer 170 maintains the engaging members 160 in their respective positions within the apertures 144 and as a result of engagement of the engaging members 160 with the second contoured surface 159 of the piston 150, the piston 150 is retained in the disengaged position after force is no longer applied to the piston 150 by the lever 116. The disengaged position of the piston 150 continues until the bearing retainer 170 is retracted, as will be explained herein.

The bearing retainer 170 is moved from the extended position to the retracted position when the coupler 180 is moved into engagement with the receiver 110 to define the engaged position. The coupler 180 includes a coupler body 181, which is connected to the tooling assembly 104. One or more apertures 182 can be formed in the coupler body 181 for receiving the mechanical code pins 114. The coupler housing is connected to a coupler ring 190 that is engageable with the receiver 110 to connect the coupler 180 to the receiver 110, as will be explained in detail herein. The coupler ring 190 can be received in a recess 184 that is defined by the coupler body 181. A shoulder 186 can be formed within the recess 184.

Figure 11:
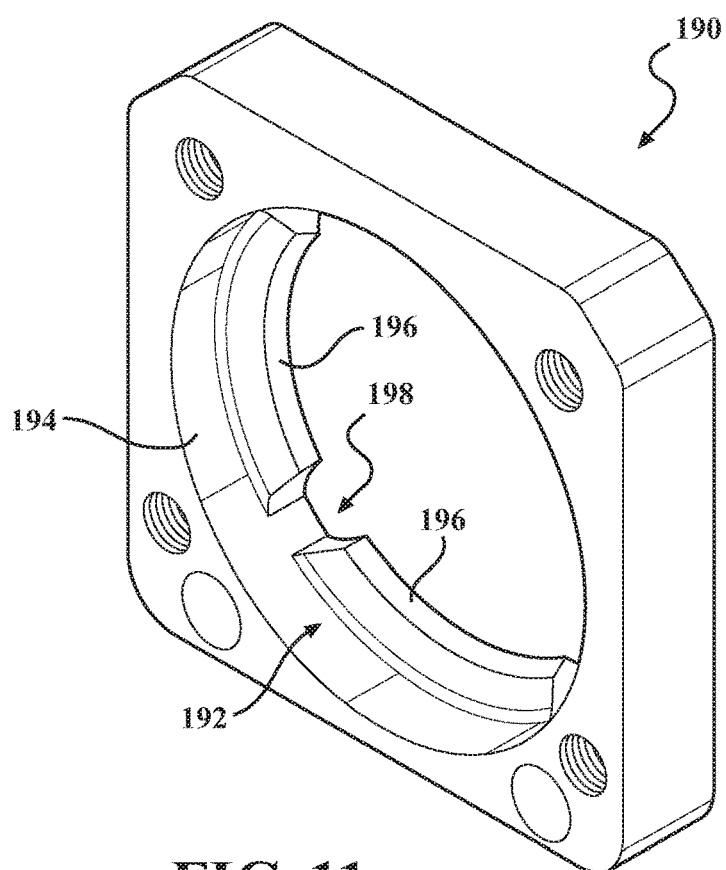
FIG. 11 is a perspective view of a coupler ring.
Figure 12:
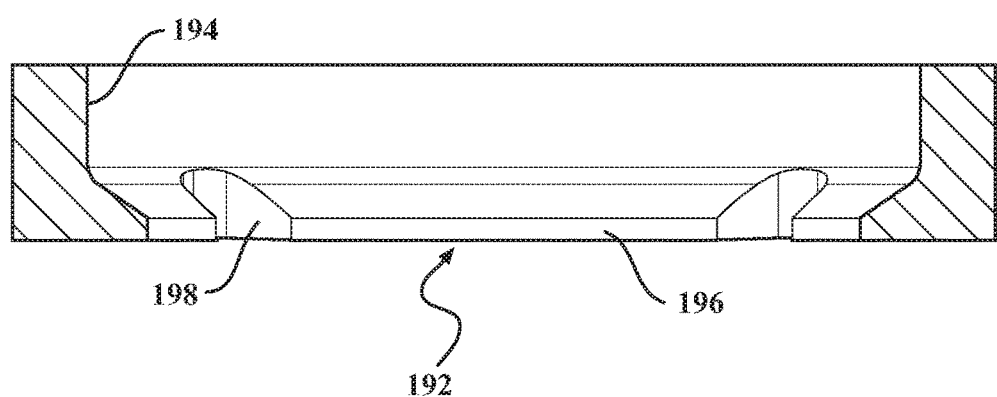
FIG. 12 is a cross-section view of the coupler ring.

As best shown in FIGS. 11-12, the coupler ring 190 can define a central opening 192, wherein at least a portion of the receiver 110 is adapted to be received within the central opening 192 of the coupler ring 190. The central opening 192 is defined in part by an annular wall 194 that extends around the central opening 192. One or more annular projections 196 extend inward from the annular wall 194 toward a radial center of the central opening 192. The annular projections 196 are adapted to engage the engaging members 160 of the receiver 110 when the receiver 110 is connected to the coupler 180. The annular projections 196 define a ring having a minimum inside diameter that is complementary to the outside diameter of the cylindrical wall 138 of the receiver housing 130. The ring defined by the annular projections 196 is interrupted by openings 198 that are formed by or disposed between adjacent pairs of the annular projections 196 to allow the posts 146 of the receiver housing 130 to move past the annular projections 196 when the receiver 110 and the coupler 180 are moved to the connected position. The openings 198 may be structures such as slots, gaps, or other types of openings.

Figure 15:
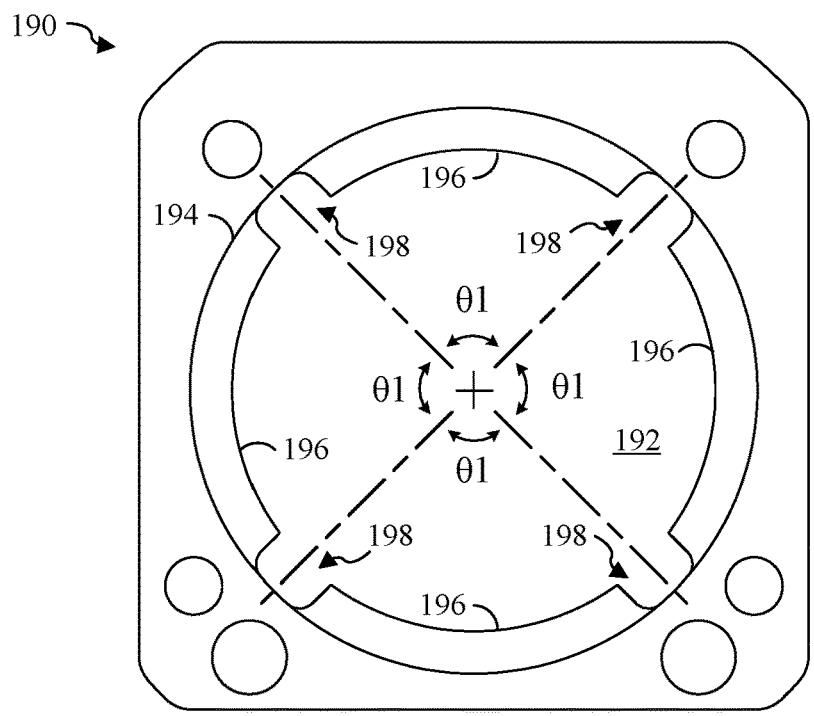
FIG. 15 is a front view of the coupler ring.
Figure 16:
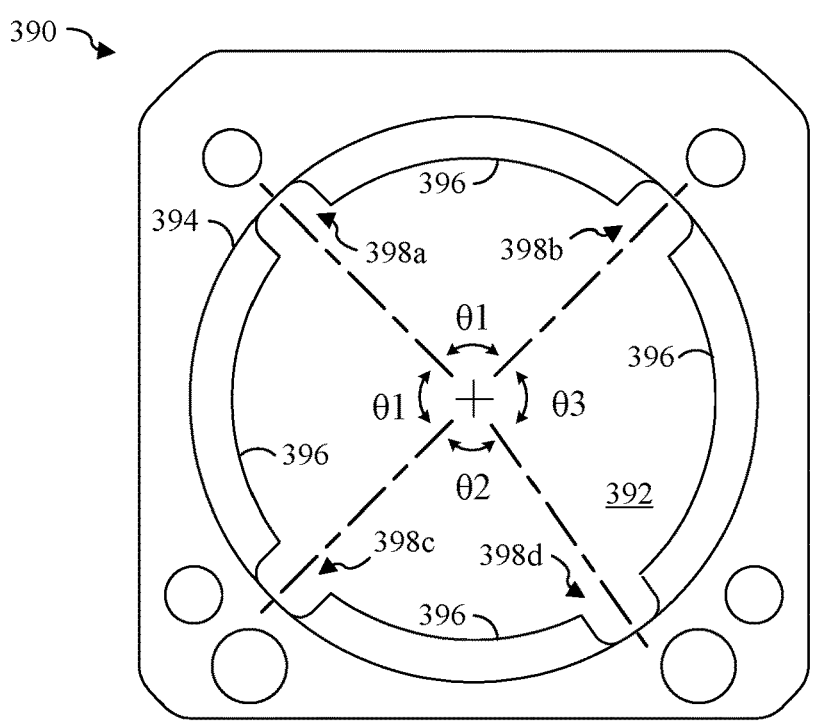
FIG. 16 is a front view of an alternative coupler ring.

As shown in FIG. 15, the openings 198 of the coupler ring 190 may be evenly spaced radially around the annular wall 194 at angles θ1, where θ1 is equal to 90 degrees. As used herein, evenly spaced radially means that the angular spacing between all adjacent pairs of openings 198 is the same, as measured with respect to the radial center of the central opening 192. As shown in FIG. 16, an alternative coupler ring 390 includes a central opening 392, an annular wall 394, annular projections 396, and openings 398a, 398b, 398c, and 398d, which are all similar to corresponding parts of the coupler ring 190, except that the openings 398a, 398b, 398c, and 398d are not evenly spaced radially around the annular wall 394. This uneven radial spacing prevents installation of the coupler and receiver at an incorrect angular orientation, since the posts 146 would be arranged in correspondence with the locations of the openings 398a, 398b, 398c, and 398d and would engage the coupler ring 190 to prevent incorrect installation. In the illustrated example, opening 398a is spaced from opening 398b by angle θ1, where θ1 is equal to 90 degrees, opening 398a is spaced from opening 398c by angle θ1, opening 398a is spaced from opening 398b by angle θ1, where θ1 is equal to 90 degrees, opening 398c is spaced from opening 398d by angle θ2, where θ2 is equal to 80 degrees, and opening 398b is spaced from opening 398d by angle θ3, where θ3 is equal to 100 degrees. As used herein, unevenly spaced radially means that the angular spacing between at least one adjacent pair of openings 398a-d is not the same as the angular spacing between at least one other adjacent pair of openings 398a-d, as measured with respect to the radial center of the central opening 392.

When the coupler 180 is moved into the engaged position with respect to the receiver 110, the receiver housing 130 enters the central opening 192 of the coupler ring 190. The coupler ring 190 engages the bearing retainer 170, thereby moving the bearing retainer 170 from its extended position to its retracted position during movement of the coupler 180 toward the receiver 110. Once the bearing retainer 170 is no longer positioned adjacent to the apertures 144, the biasing force of the compression spring 152 moves the piston downward away from the receiver housing 130, and the resulting engagement of the second engagement surfaces 159 of the piston 150 with the engaging members 160 forces the engaging members 160 outward with respect to the receiver housing 130 through the apertures 144. As best seen in FIG. 5, this places the engaging members 160 into engagement with the annular projections 196 of the coupler ring 190 while the engaging members 160 are held in place by engagement with the first engaging surfaces 158, 159 of the piston 150. While the engaging members 160 are held in engagement with the coupler ring 190 by the piston 150, the coupler 180 is locked in the engaged position with respect to the receiver 110. As previously described, in order to disengage the coupler 180 with respect to the receiver 110, the lever 116 is moved to the released position, thereby compressing the compression spring 152, which allows the engaging members 160 to move into the receiver housing 130 in response to a camming action that is applied to the engaging members 160 by the wedge-like profile of the annular projections 196 of the coupler ring 190 under the influence of the bearing retainer 170 and the biasing element 172, which urges the coupler 180 away from the engaged position with respect to the receiver 110 once the engaging members 160 are free to move into the receiver housing 130.

As best shown in FIGS. 13-14, the damper 210 resists motion. In the illustrated example, motion of a damper piston that includes the piston rod 212 and a piston head 214 is resisted by passing a fluid through ports including a first group of ports 230 and a second group of ports 232. The piston rod 212 and the piston head 214 can be integrally formed or separately formed and connected in a fixed relationship. The ports of the first group of ports 230 and second group of ports 232 are defined in the piston head 214, which is fixed to the piston rod 212. The first group of ports 230 and second group of ports 232 each allow fluid to flow past the piston head 214 as the piston head 214 moves axially.

The damper 210 includes a damper housing 216 that defines an interior space 217. The damper housing 216 may be a hollow cylindrical member and may be referred to as a damper cylinder. Fluid is disposed within the interior space 217 to resist axial movement of the piston head 214 within the interior space 217. In one implementation, the fluid is a gas. In another implementation, the fluid is a liquid such as an oil. The damper housing 216 includes a closed end and an open end. A seal assembly is disposed in the open end of the damper housing 216. The seal assembly includes a seal body 218 with an aperture 220. The piston rod 212 extends through the aperture. The seal assembly also includes a first sealing ring 222 and a second sealing ring 224. The first sealing ring 222 engages the damper housing 216 and the seal body 218. The second sealing ring engages the seal body 218 and the piston rod 212, and is retained on the seal body by a retainer ring 226.

A bore 228 at the closed end of the damper housing 216 can be used to connect the damper 210 to the piston 150 by a conventional fastener such as a screw.

The damper 210 is configured to resist motion of the piston 150 away from the receiver housing 130 under the influence of the biasing element 152. Thus, after the lever 116 is moved to the release position, thereby compressing the biasing element 152 and moving the piston 150 toward the receiver housing 130, the piston 150 and the lever 116 do not immediately return to the locked position. Instead, movement of the piston 150 away from the receiver housing 130 occurs slowly, at a rate determined by the force applied by the biasing element 152 and the configuration of the ports in the piston head 214. As a result, the lever 116 need not be manually held in the release position while the coupler 180 is removed from the receiver 110. Instead, after the lever 116 is moved to the release position, there is a time period in which the coupler 180 will be removable, until the movement of the piston 150 causes the engaging members 160 to re-engage the coupler ring 190. During this time, the coupler 180 can be supported with respect to the receiver 110 by the elongate hook 188 and the elongate flange 118.

The damper 210 can be configured to resist motion of the piston 150 toward the receiver housing 130 to a lesser degree than it resists motion of the piston 150 away from the receiver housing 130. For example, the first group of ports 230 can include one or more ports having a smaller aggregate area than that of one or more ports from the second group of ports 232. A valve member 234 is provided to block the second group of ports while the piston rod 212 of the damper 210 moves in response to motion of the piston 150 away from the receiver housing 130. This slows the rate of fluid flow through the piston head 214 and thus slows the piston 150. The valve member 234 does not block the second group of ports 232 when the piston 150 is moving toward the receiver housing 130, to provide less restriction in this direction. For example, the valve member 234 can be a rubber flap that extends around the piston rod 212, is seated against the piston head 214, and is held in place by a retainer ring 236. As fluid flows from the side of the piston head 214 on which the valve member 234 is provided, the valve member 234 covers the ports of the second group of ports 232 and the fluid flows past the piston head 214 through the first group of ports 230 but not through the second group of ports 232, because the second group of ports 232 is obstructed by the valve member 234 while the first group of ports 230 is not obstructed by the valve member 234. As fluid flows from the side of the piston head 214 opposite the valve member 234, the valve member 234 is moved away from the piston head 214 by fluid pressure to open the ports of the second group of ports 232, and the fluid flows past the piston head 214 through the first group of ports 230 and the second group of ports 232, because the first group of ports 230 and the second group of ports 232 are not obstructed by the valve member 234.

In operation, the coupler 180 is manually connected to the receiver 110 by an operator (i.e. a person). The operator aligns the coupler 180 with the receiver 110 and then slightly angles the coupler 180 upward while hooking the elongate hook 188 of the coupler 180 onto the elongate flange 118 of the receiver 110. After the elongate hook 188 is engaged with the elongate flange 118, the operator rotates the coupler 180 downward toward axial alignment with the receiver 110. During this motion, the coupler ring 190 of the coupler 180 engages the bearing retainer 170 and moves the bearing retainer 170 into the channel 142 of the receiver housing 130 by compressing the biasing element 172. As the coupler ring 190 passes the engaging members 160, the engaging members 160 are forced outward by the piston 150, which is urged away from the receiver housing 130 by the compression spring 152. The engaging members 160 are held in engagement with the interior of the coupler ring 190 by the force applied to the engaging members 160 by the piston 150 to lock the coupler 180 to the receiver 110.

When the operator wishes to release the coupler 180 from the receiver 110, the operator first pivots the lever 116 toward the coupler 180 to the release position of the lever 116. This moves the piston 150 toward the receiver housing 130 by compressing the compression spring 152 and releasing the force applied to the engaging members 160 by the piston 150. When the operator releases the lever 116, the spring force applied to the piston 150 by the compression spring 152 urges the piston 150 away from the receiver housing toward the locked position, but this motion is slowed by the damper 210. Thus, the operator need not hold the lever 116 while removing the coupler 180 from the receiver 110. Before the piston 150 causes the engaging members 160 to re-engage the coupler ring 190, the operator pivots the coupler 180 upward slightly to disengage the coupler ring 190 from the bearing retainer 170, so that the bearing retainer 170 can hold the engaging members in the receiver housing 130. The operator then lifts the coupler 180 from the receiver 110 to disengage the elongate hook 188 of the coupler 180 from the elongate flange 118 of the receiver 110.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A modular tooling receiver, comprising:
a wall having a port that extends through it;
an engaging member that is movably disposed in the port;
a lock actuator that is disposed on a first side of the wall, wherein the lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall;
a first biasing element that biases the lock actuator toward the first position;
a damper that controls a rate of motion of the lock actuator from the second position toward the first position; and
a biased retainer subject to a biasing force that repositions the retainer between first and second positions to regulate movement of the engaging member.

2. The modular tooling receiver of claim 1, wherein the retainer is positioned on the second side of the wall, the retainer being configured and dimensioned such that, in the first position, the retainer is in engagement with the engaging member to obstruct movement of the engaging member in the first direction, and in the second position, the retainer permits movement of the engaging member in the first direction.

3. The modular tooling receiver of claim 2, further comprising:
a second biasing element that biases the retainer toward the first position of the retainer.

4. The modular tooling receiver of claim 3, wherein the wall is cylindrical and the retainer is a ring.

5. The modular tooling receiver of claim 1, wherein the wall is cylindrical.

6. The modular tooling receiver of claim 5, wherein the lock actuator is a piston.

7. The modular tooling receiver of claim 5, wherein the engaging member is spherical.

8. The modular tooling receiver of claim 1, further comprising:
a lever that is engageable with the lock actuator for causing movement of the lock actuator from the first position toward the second position.

9. The modular tooling receiver of claim 1, wherein the engaging members are operable to retain engagement with a modular tooling adapter in the first position and release the modular tooling adapter in the second position.

10. A modular tooling receiver, comprising:
a wall having a port that extends through it;
an engaging member that is movably disposed in the port;
a lock actuator that is disposed on a first side of the wall, wherein the lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall;
a first biasing element that biases the lock actuator toward the first position; and
a damper that controls a rate of motion of the lock actuator from the second position toward the first position, wherein the damper is a fluid damper.

11. The modular tooling receiver of claim 10, wherein the damper includes a damper housing, a damper piston that is disposed within the damper housing, and a fluid that is disposed within the damper housing.

12. The modular tooling receiver of claim 11, wherein the damper piston includes a piston head having one or more ports that allow fluid to flow past the piston head.

13. The modular tooling receiver of claim 11, wherein the damper includes a valve member that at least partially restricts fluid flow during motion of the lock actuator from the second position toward the first position.

14. The modular tooling receiver of claim 11, wherein the damper piston includes a piston head having a first group of one or more ports that allow fluid to flow past the piston head, a second group of one or more ports that allow fluid to flow past the piston head, and a valve member that obstructs fluid flow through the second group of one or more ports during motion of the lock actuator from the second position toward the first position.

15. The modular tooling receiver of claim 14, wherein fluid flow through the first group of one or more ports is not obstructed by the valve member during motion of the lock actuator from the second position toward the first position.

16. A modular tooling receiver, comprising:
a housing having an internal cavity, a cylindrical wall that surrounds the internal cavity and extends along a longitudinal axis, and a plurality of ports that extend through the cylindrical wall in a direction that is substantially transverse to the longitudinal axis;
a plurality of engaging members that are each at least partially seated in a respective port from the plurality of ports and are moveable with respect to the cylindrical wall;
a piston that is disposed within the internal cavity, the piston having a first engagement surface formed on an outer periphery thereof and a second engagement surface formed on an outer periphery thereof, wherein the piston is movable between a first position and a second position with respect to the housing;
wherein the piston is moveable between a first position in which the piston urges the engaging members in an outward direction relative to the cylindrical wall and a second position wherein the piston permits the engaging members to move inward relative to the cylindrical wall;
a first biasing element that biases the piston toward the first position; and
a fluid damper that controls a rate of motion of the piston from the second position toward the first position.

17. The modular tooling receiver of claim 16, further comprising:
a ring member that encircles the cylindrical wall of the housing, wherein the ring member is moveable between a first position in which the ring member is in engagement with the engaging members to obstruct movement of the engaging members in the outward direction and a second position in which the ring member permits movement of the engaging members in the outward direction; and
a second biasing element that biases the ring member toward the first position of the ring member.

18. The modular tooling receiver of claim 17, wherein the damper includes a damper housing configured and dimensioned to retain fluid therein and a damper piston that is disposed within the damper housing.

19. The modular tooling receiver of claim 18, wherein the damper piston includes a piston head having a first group of one or more ports that allow fluid to flow past the piston head, a second group of one or more ports that allow fluid to flow past the piston head, and a valve member that obstructs fluid flow through the second group of one or more ports during motion of the piston from the second position toward the first position.

20. The modular tooling receiver of claim 19, wherein fluid flow through the first group of one or more ports is not obstructed by the valve member during motion of the piston from the second position toward the first position.

* * * * *